3,460,907
MANUFACTURE OF COKE AND LOW CTE
GRAPHITE FROM PETROLEUM DERIVED
FEED MATERIALS
Donald L. Winsett, Robinson, Ill., assignor to Marathon
Oil Company, Findlay, Ohio, a corporation of Ohio
No Drawing. Filed July 12, 1965, Ser. No. 471,430
Int. Cl. C01b 31/04; C10g 39/00
U.S. Cl. 23—209.1    3 Claims

ABSTRACT OF THE DISCLOSURE

The present invention comprises a process for the preparation of precursor forms of carbon which, when graphitized, have an ultimate coefficient of thermal expansion of not more than about $5 \times 10^{-7}$ in./in./° C. average at from 20 to 100° C. which process comprises the steps of pyrolying a petroleum naphtha having a sulfur content of less than about 1%, an oxy compound content of from 0 to about 6%, and an aromatic content of from about 85 to about 100% by weight at a temperature of from 1000 to about 7000° F. and a pressure of at least about 10 p.s.i.g., separating out the termal resin boiling above 500° F. which is thus formed, charging said thermal resin to a heater in which said thermal resin is heated with agitation to from 900 to about 975° F. for a length of time insufficient to form substantial amounts of solids, and thereafter, before the residue from the heating step has cooled below about 875° F., charging said heated residue to a solidification chamber so as to deposit said heated residue to a depth of not less than about 5 feet, the residue in said chamber being cooled sufficiently slowly to prevent said residue from cooling to below 700° F. in less than about 30 minutes and maintaining said residue in said chamber for a length of time sufficient to convert a substantial quantity of said residue into the above-described graphitic precursor, and thereafter cooling and recovering said precursor, and various products produced thereby.

The present invention relates to new methods for the formation of forms of carbon having especially excellent dimensional stability under variations in temperature, and in particular, the invention relates to the preparation of such forms of carbon and their precursors by subjecting selected petroleum fractions to controlled conditions of temperature and pressure.

Because of its resistance to high temperature, relatively high tensile strength, relative chemical inertness and other desirable characteristics, carbon is particularly valuable as a refractory construction material. In operations involving highly elevated temperatures, change of dimension of structural shapes with increases in temperature is well known to cause stresses both internally within individual members and also externally at joints and points of contact between members. Such thermal stresses are usually of very high magnitude and may readily cause failure of the structures. For these reasons, any form of carbon which retains its excellent physical and chemical characteristics and which exhibits little or no change in dimensions under varying conditions of temperature is highly desirable.

The present invention embodies the discovery that by the careful selection of petroleum-derived feed materials and by control of the temperatures and pressures to which such feed materials are subjected, a precursor form of carbon is produced which, when graphitized by heating to high temperatures, yields a graphitic form of carbon which has a coefficient of thermal expansion (CTE) of not more than about $5 \times 10^{-7}$ in./in.° C. averaged over the range of 20 to 100° C. In addition, the density of both the precursors and the graphitized products of the present invention is significantly higher than the average of similar materials.

The precursor types of carbon of the present invention may be pulverized and preferably bound together with a petroleum pitch and other carbonaceous adhesive and then graphitized by subjecting to high temperatures in order to form a wide variety of structural shapes, electrical parts, and chemical apparatus. Because of their high dimensional stability, and great resistance to high temperatures, graphitized products made from the precursor carbons of the present invention are especially useful for the lining of rocket exhaust nozzles, for electric furnace electrodes, and for other high temperature protective lining applications.

Also, the process of the present invention yields a superior precursor product which itself is valuable without graphitization. The precursor of the present invention exhibits a high degree of crystallinity making it particularly valuable for use in the preparation of electrodes, especially electrodes for the production of steel and aluminum. Aluminum electrodes are produced according to the processes described hereinafter except that the prebake temperature is approximately 1,400 to about 1,750° F. and no further treatment is necessary. That is, the graphitization step only is eliminated.

The preferred starting materials for the process of the present invention are produced by the pyrolysis of petroleum naphthas which have sulfur contents of less than about 1%, oxygen-containing compounds constituting from 0 to about 6%, and aromatic contents of from about 85 to about 100%. (Throughout the disclosure and claims of the present application, all percents are percents by weight unless otherwise specified.)

The petroleum naphtha is preferably pyrolyzed at a temperature of from 1,000 to about 7,000° F. and most preferably at a temperature of from 1,300 to 1,700° F. and at a pressure somewhat in excess of atmospheric, preferably above about 10 p.s.i.g. and most preferably from about 25 to about 350 p.s.i.g. Pyrolysis in the presence of from about 0.5 to about 0.8 mole of steam per mole of petroleum naphtha is particularly desirable.

The residue formed by pyrolysis is then distilled to separate out a thermal resin boiling above about 500 and preferably above about 600° F. This thermal resin is charged to a heating system, preferably a series of furnaces equipped with heating coils through which the thermal resin moves continuously. Where a series of furnaces is employed, the temperature can preferably be stepped up gradually from furnace to furnace for maximum efficiency. In any case, the thermal resin is heated to from 900 to about 975° F. with at least the agitation caused by moving through the heating coils.

The residence time in the heaters must be controlled to prevent the formation of graphite precursors in the heating coils with consequent clogging of the coils. In general, the thermal resin will be moved from the heaters virtually immediately after a temperature of 975° F. has been obtained. Permissible delays will vary with the velocity through the heater coils, the geometry of the heaters, etc., but residence time in the heaters after a temperature of about 900° F. has been achieved should not exceed 5 minutes, and is preferably between 0.5 and 5 minutes. In addition, it is important that flow through the heaters be uniform and continuous with no back cycling or eddy currents which would cause stagnation in parts of the heating coil and prevent portions of the thermal residue to remain beyond the above-mentioned time interval. Total residence time in the furnaces will preferably be from 0.5 to about 5 minutes.

It has also been found important to the production of the low CTE graphite of the present invention that the thermal resin not cool below about 875° F. prior to its entry into the solidification chamber in which the carbon precursor for the low CTE graphite is formed. This chamber will preferably be designed to permit the material to lie relatively undisturbed. A bottom inlet is preferred to minimize the agitation by incoming materials. The chamber will be vented to permit the escape of hydrogen and other gases and vapors evolved during the solidification process.

The rate of reduction of temperature in the chamber with respect to time has been found surprisingly important to the obtaining of the superior products of the present invention. The residue after depositing in the chamber must be cooled sufficiently slowly so that it does not cool below 700° F. in less than about 30 minutes and preferably a temperature of about 800° F. or more will be maintained for at least 3 hours.

This slow cooling may be accomplished by externally insulating the chamber to permit only relatively slow loss of heat to the ambient air, or by designing a chamber large enough so that cooling at all points except those immediately adjacent to the outside will be sufficiently slow, or by condensing said recycling the oil vapors vented during the solidification process back through the heating furnaces and then utilizing the heated oils to warm the solidifying thermal resin. Where the precursor itself is used as an internal insulator, the layers near the outside walls of the chamber will generally not exhibit the desirably low CTE's of the present invention and will either be segregated or sufficiently diluted with high quality material from the interior of the chamber to provide a product having an acceptably low average CTE.

A further geometric parameter of the chamber has been found important. The material must be deposited in the solidification chamber to a depth of not less than about 5 feet and preferably of more than 20 feet for best results. In order to remove this thick layer of solid graphite precursor, the solidification chamber will usually have removable ends to permit access to the cooled graphitic precursor. Removal will be generally accomplished by water drills, pneumatic hammers, or other methods of breaking up the solid cake of material.

While the lumps of solid material removed from the solidification chamber may be themselves graphitized, in actual practice, they will preferably be reduced in size usually by crushing in conventional equipment.

The crushed materials are then heated to remove the volatile content which may be from 2 to about 15% after crushing. This is preferably accomplished by heating in a rotary hearth to from 2,000 to about 2,400° F. for from 5 minutes to about 1 hour and preferably for about 20 minutes. Other conventional heating devices may, of course, be employed in lieu of the rotary hearth but to obtain the low CTE characteristics of the present invention, the devolatilizing temperature must be in the relatively narrow range mentioned above, and in an atmosphere substantially free from oxygen. Oxygen content will preferably be below 2%.

The calcined material is then crushed, ground, pulverized, or otherwise reduced to a desired particle size, generally a distribution between 2 and about 325 mesh as measured on the Tyler sieve size is preferred. The ground, calcined material is preferably mixed with a suitable binder such as a cool tar pitch or petroleum pitch. (In order to preserve the low CTE of the material, as little binder as possible is preferably added.)

The blend of binder and calcined and ground graphite precursor is then formed into suitable shapes preferably by molding or by extrusion. Extrusion may be carried out at elevated temperature in order to maintain the binder fluid and permit the extruded mass to have reasonable viscosity. About 80 to 120° C. is a preferred range of temperature during extrusion. Extrusion pressure may vary from 100 to 10,000 p.s.i. depending on the viscosity of the mix and the geometry and size of the die through which the material is being extruded. In general, conventional extrusion techniques are applicable.

Molding may be accomplished by a number of conventional means including compression molding where the mixture is compressed in a mold or die of the desired configuration by means of a ram, vibratory molding wherein the mixture is compacted into a mold by severe vibration of the mold, or other conventional molding techniques.

The molded shapes will preferably be prebaked to a temperature of from 1,400 to about 1,750° F. to harden them. This prebaking may be accomplished in any conventional electric gas fired or similar furnace. If close dimensional tolerances are required in the finished parts, some trimming or machining can be performed on the shapes after the prebake. The low sulfur of the feedstocks of the present invention has been found necessary to the prevention of excessive distortion during prebake and subsequent graphitization.

The prebaked shapes are graphitized by heating gradually to about 4,700 to about 5,450° F., and preferably to about 5,100° F. During graphitization, hydrogen and in some instances, sulfur will be evolved, together with further volatile materials which were not evolved during the calcination process. In general, the slower the graphitization occurs, the better. Heating times of from 5 hours to about 5 days are preferred.

Example I

A petroleum naphtha having an initial boiling point of 100° F. and an end point of about 200° F., containing 0.5% by weight sulfur, is pyrolyzed under an outlet pressure of approximately 15 p.s.i.g. and at a temperature of about 1,500° F. by holding for a residence time of about 0.5 second in a conventional petroleum fired furnace having an interior heating coil through which the naphtha passes. At the entrance to the furnace, about 0.7 pound of steam per pound of naphtha are introduced into the heating coil. The resulting pyrolysis products are fractionated to yield olefins, pyrolysis gasolines, gas oils, and a thermal resin initially boiling at about 700° F. This thermal resin is stirred in a bottoms receiver connected to the bottom of the fractionating column. Thereafter, the thermal resin is run through the heating coil of a conventional gas fired furnace until a temperature of about 945° F. is reached. The residence time of the thermal resin in the furnace is roughly one minute and this time is controlled to prevent the formation of solids which might clog the furnace. The effluent from the heating coil of the furnace is transferred directly into a solidification chamber. This solidifiaction chamber consists of a vertical cylindrical steel vessel having a height of about 85 feet and a diameter of 25 feet. The thermal resin is introduced into the bottom of the vessel through a 4-inch diameter inlet not mounted flush with the bottom. The incoming coke is deposited to a depth of about 50 feet and hydrogen and other gases are permitted to escape at about 50 p.s.i.g. through a vent in the top of the solidification chamber. After the desired level of graphite precursor has been built up in the solification chamber, the flow of thermal resin through the heating coils of the furnaces is discontinued and oil vapors in the escaping gases from the solidification chamber are condensed and cycled through the heating furnaces and back through the bottom inlet of the solidification chamber. The recycle oils have a temperature of about 700° F. as they pass through the inlet to the solidification chamber and flow of oils is continued for about 4 hours to maintain the average temperature of the carbon in the chamber at about 700° F. After this time, the recycling of the oils is discontinued. The vent remains open and the oils are vented to storage for later processing, e.g., thermocracking. Cooling is deliberately quite gradual and an average temperature of 600° F. is reached only after about 5 hours. Thereafter, the cooling is accelerated by quenching with water in order to permit the solidification chamber to be cleared and used for the next batch.

The solidification chamber is equipped with removable top and bottom and after these have been unbolted, water drills are used to break up the graphite precursor into chunks which are then moved to the crushing area. The chunks are crushed to 2 inches with a conventional crusher. The crushed particles are passed through a rotary hearth furnace operating at a temperature of 2,200° F. for an average residence time of about 20 minutes in order to remove the major portion of the volatiles contained within the particles. The finished particles are then allowed to cool and are sized as required. About 50% particles 12 to 200 mesh and about 50% smaller than 200 mesh are then mixed with a conventional petroleum pitch in a conventional liquid/solid blender. About 0.25 pound of pitch are used for each pound of ground carbon. The pitch/carbon mixture is shaped by extruding through dies to form cylindrical shapes about ⅝ inch in diameter and 6 inches long. These shapes are prebaked in a conventional furnace at a temperature of about 1,800° F. for about 2 hours. After prebaking, the cylinders are shaved slightly with steel blades to restore them to their original dimensions, and compensate for distortion during the prebake. The cylindrical shapes are fired in an electrically heated furnace operating at a temperature of about 5,200° F. for a preiod of about 0.5 hour in order to convert them to graphite. When the cylinders are removed, they are found to have the metallic luster characteristic of both natural and synthetic grapihte.

Example II

When the graphite cylinders produced in Example I are tested for their coefficient of thermal expansion according to the procedure of D. H. Bangham and Rosalind E. Franklin, "Thermal Expansion of Coals and Carbonised Coals," Faraday Soc. Trans., vol. 42B, pages 289–295 (1946), the average coefficient of thermal expansion along the major axis of the test specimens is found to be $0.1 \times 10^{-6}$ per ° C. as compared to the values of 1.0 to about $2.5 \times 10^{-6}$ commonly reported for petroleum derived graphites, and the roughly similar values reported for synthetic graphite.

It should be understood that the foregoing examples and discussion are to be taken to be merely illustrative of the present invention and are to limit it in no manner and to no degree.

What is claimed is:

1. A process for the prepaartion of precursor forms of carbon which when graphitized have an ultimate coefficient of thermal expansion of not more than about $5 \times 10^{-7}$ in./in./° C. average at from 20 to 100° C. which process comprises the steps of pyrolyzing a petroleum naphtha having a sulfur content of less than about 1% an oxy compound content of from 0 to about 6%, and an aromatic content of from about 85 to about 100% by weight at a temperature of from 1000 to about 7000° F. and a pressure of at least about 10 p.s.i.g., separating out the thermal resin boiling above 500° F. which is thus formed, charging said thermal resin to a heater in which said thermal resin is heated with agitation to form 900 to about 975° F. for a length of time insufficient to form substantial amounts of solids, and thereafter, before the residue from the heating step has cooled below about 875° F., charging said heated residue to a solidification chamber so as to deposit said heated residue to a depth of not less than about 5 feet, the residue in said chamber being cooled sufficiently slowly to prevent said residue from cooling to below 700° F. in less than about 30 minutes and maintaining said residue in said chamber for a length of time sufficient to convert a substantial quantity of said residue into the above-described graphitic precursor, and thereafter cooling and recovering said precursor.

2. The process of claim 1 wherein the thermal resin remains in the heater for an average residence time of from 0.5 to about 5 minutes and the residue in the solidification chamber is maintained at a temperature of about 800° F. or more for at least 3 hours.

3. The process of claim 1 wherein the graphitic precursor is comminuted to an average particle size of from about 2 to about 325 mesh, thereafter heated to about 2,000 to 2,400° F. for about 5 minutes to 1 hour in an atmosphere having an oxygen content below 2% by weight to remove volatile materials, molded into desired shapes, and thereafter converted to grapihte by exposure to temperatures of from about 4,700 to about 5,450° F. for from 5 hours to about 5 days.

References Cited

UNITED STATES PATENTS

| 2,199,759 | 5/1940 | Schnetzler | 208—131 |
| 3,310,611 | 3/1967 | Zocher | 264—29 X |
| 3,338,817 | 8/1967 | Zrinscak et al. | 23—209.1 X |
| 2,775,549 | 12/1956 | Shea | 208—50 |
| 2,922,755 | 1/1960 | Hackley | 208—106 |
| 3,173,852 | 3/1965 | Smith | 208—46 |
| 3,326,796 | 6/1967 | Muller | 208—50 |

OTHER REFERENCES

Sachanen: "Conversion of Petroleum," copyright 1948, Reinhold Publishing Corp., pages 249–252.

EDWARD J. MEROS, Primary Examiner

U.S. Cl. X.R.

23—209; 208—46, 50; 264—29